(12) United States Patent
Oberg et al.

(10) Patent No.: US 7,286,311 B1
(45) Date of Patent: *Oct. 23, 2007

(54) THERMAL ASPERITY COMPENSATION IN PERPENDICULAR RECORDING

(75) Inventors: Mats Oberg, Cupertino, CA (US);
Pantas Sutardja, Los Gatos, CA (US);
Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 823 days.

This patent is subject to a terminal disclaimer.

(21) Appl. No.: 10/754,325

(22) Filed: Jan. 9, 2004

Related U.S. Application Data

(63) Continuation-in-part of application No. 10/612,400, filed on Jul. 2, 2003, now Pat. No. 6,995,932, which is a continuation of application No. 09/850,039, filed on May 7, 2001, now abandoned.

(60) Provisional application No. 60/487,693, filed on Jul. 16, 2003.

(51) Int. Cl.
*G11B 5/02* (2006.01)

(52) U.S. Cl. ........................................ 360/25

(58) Field of Classification Search .................. 360/25, 360/65, 48, 46, 45, 53, 31; 369/59.22; 375/232
See application file for complete search history.

(56) References Cited

U.S. PATENT DOCUMENTS

| | | | |
|---|---|---|---|
| 4,739,514 A * | 4/1988 | Short et al. ................ | 381/103 |
| 4,963,963 A * | 10/1990 | Dorman ...................... | 348/164 |
| 5,233,482 A | 8/1993 | Galbraith et al. | |
| 5,745,585 A * | 4/1998 | Carpentier ................. | 381/103 |
| 5,745,978 A | 5/1998 | Aboaf et al. | |
| 5,831,456 A | 11/1998 | Sutardja | |
| 5,920,449 A | 7/1999 | Tagawa | |
| 5,933,299 A | 8/1999 | Tanaka et al. | |
| 5,995,313 A | 11/1999 | Dakroub | |
| 5,999,510 A * | 12/1999 | Enomoto ................ | 369/124.13 |
| 6,005,726 A | 12/1999 | Tsunoda | |
| 6,040,953 A | 3/2000 | Malone et al. | |
| 6,101,054 A | 8/2000 | Tsunoda | |
| 6,104,557 A | 8/2000 | Kasai et al. | |
| 6,119,261 A | 9/2000 | Dang et al. | |
| 6,130,791 A | 10/2000 | Muto | |
| 6,130,793 A | 10/2000 | Ohmori et al. | |
| 6,137,643 A | 10/2000 | Flynn | |
| 6,147,827 A | 11/2000 | Southerland et al. | |
| 6,212,047 B1 | 4/2001 | Payne et al. | |
| 6,414,806 B1 | 7/2002 | Gowda et al. | |
| 6,446,236 B1 * | 9/2002 | McEwen et al. ............ | 714/795 |
| 6,501,610 B1 | 12/2002 | Sugawara et al. | |

(Continued)

*Primary Examiner*—Fred F. Tzeng

(57) ABSTRACT

A data detection circuit includes a transient detector that senses transient events in data. A first data detector path applies a first equalization target to generate a first bit stream from the data. A second data detector path applies a second equalization target to generate a second bit stream from the data. A baseline correction circuit generates a baseline correction signal using the first bit stream when the transient detector does not sense the transient events and the second bit stream when the transient detector senses the transient events. The first equalization target is a non-DC free equalization target and the second equalization target is a DC-free equalization target. When transients are detected during a sector, the detection circuit continues using the DC-free equalization target until the sector ends.

82 Claims, 10 Drawing Sheets

U.S. PATENT DOCUMENTS

| | | | |
|---|---|---|---|
| 6,665,336 B2 * | 12/2003 | Abdelilah et al. | 375/225 |
| 6,674,707 B2 * | 1/2004 | Ogura et al. | 369/59.22 |
| 6,678,230 B2 * | 1/2004 | Miyashita et al. | 369/53.16 |
| 6,724,555 B2 * | 4/2004 | Ohta | 360/65 |
| 6,765,741 B2 * | 7/2004 | Berman et al. | 360/65 |
| 6,934,233 B2 * | 8/2005 | Miyashita et al. | 369/53.16 |
| 6,937,551 B2 * | 8/2005 | Miyashita et al. | 369/53.16 |
| 7,184,476 B2 * | 2/2007 | Lee et al. | 375/232 |
| 2002/0060869 A1 | 5/2002 | Sawaguchi et al. | |
| 2002/0060871 A1 * | 5/2002 | Hamaguchi et al. | 360/48 |
| 2003/0043623 A1 * | 3/2003 | Shimbayashi et al. | 365/185.05 |
| 2003/0108097 A1 * | 6/2003 | Lee et al. | 375/232 |
| 2003/0169665 A1 * | 9/2003 | Miyashita et al. | 369/59.22 |

* cited by examiner

THERMAL ASPERITY COMPENSATION IN PERPENDICULAR RECORDING

CROSS-REFERENCE TO RELATED APPLICATIONS

This application is a continuation-in-part of U.S. patent application Ser. No. 10/612,400 filed on Jul. 2, 2003 now U.S. Pat. No. 6,995,932, which is a continuation of U.S. patent application Ser. No. 09/850,039 filed on May 7, 2001 now abandoned. This application also claims the benefit of U.S. Provisional Application No. 60/487,693, filed on Jul. 16, 2003. The disclosures of the above applications are hereby incorporated by reference in their entirety.

FIELD OF THE INVENTION

The present invention relates to data storage systems, and more particularly to data detection in perpendicular recording systems that are subjected to transient thermal asperity events.

BACKGROUND OF THE INVENTION

The magnetic storage industry has been increasing the storage capacity of hard drives through technological advancements such as perpendicular recording systems and magneto-resistive (MR) heads. The MR head includes an MR element that is made of a material that changes electrical resistance in response to the strength of a surrounding magnetic field.

The MR head normally glides over the spinning magnetic disk. When the MR head hits a protruding object on the disk surface, the MR element heats up rapidly and the heat decays relatively slowly. The effect of this transient phenomenon is a change in the baseline of the read-back signal that is output by the MR head, as illustrated in FIG. 1. This baseline change contains a substantial low-frequency component, which causes loss of read-back data. The severity of the loss depends on the robustness of the data detection system and the rate at which TA events occur.

Perpendicular recording systems provide higher data storage densities than conventional recording systems. However, perpendicular recording systems are typically subject to an increased rate of TA events due to the relatively close proximity of the recording head and the magnetic media. In addition, the heating of the recording head from the TA event is higher than the heating that is experienced in longitudinal recording systems due to the closer relative distance between the recording head and the media. The increased heating translates into a transient of increased duration and amplitude in the output signal of the recording head.

Therefore, the recording head signal of perpendicular recording systems typically includes both an increased rate of TA events and TA events having a longer duration. With the increased likelihood of errors, it is possible that the error correcting code (ECC) that is used in the recording system may not be able to regenerate the user data.

In perpendicular magnetic recording, a detector that utilizes a non DC-free equalization target can be used. Non-DC-free detectors are sensitive to DC-offset (baseline offset). A baseline correction circuit is often used to minimize the DC-offset. There are different sources of DC offset in a perpendicular magnetic recording system. For example, AC coupling of the pre-amplifier to the MR head may impact DC offset. The read channel front end may act as a high pass filter and cause data dependent baseline wander. Other sources are DC-offsets that are produced by analog circuits. TA, as mentioned above, is a low-frequency transient, which can be viewed as a DC-distortion.

The baseline correction circuit may generate the baseline correction signal based on bit detector outputs. When the bit detector outputs are unreliable due to TA events, signals output by the baseline correction circuit will also be unreliable. Since TA is a transient behavior, errors at the detector output are usually limited and can be handled by an error correcting code (ECC) present in most magnetic recording systems. For longer TA events, however, the error correcting capability of the ECC is typically insufficient. Furthermore, if the TA event is not very long, but the correct baseline can not be recovered, the increased error rate at the detector output may continue after the TA event is over. The error correcting capability of the ECC may be insufficient.

SUMMARY OF THE INVENTION

A data detection circuit according to the present invention includes a transient detector that senses transient events in data. A first data detector path applies a first equalization target to generate a first bit stream from the data. A second data detector path applies a second equalization target to generate a second bit stream from the data. A baseline correction circuit generates a baseline correction signal using the first bit stream when the transient detector does not sense the transient events and the second bit stream when the transient detector senses the transient events.

In other features, the transient events are thermal asperity events. The first equalization target is a non-DC free equalization target and the second equalization target is a DC-free equalization target. The first data detector path includes a first finite impulse response (FIR) equalizer that receives the data and a first data detector that receives an output of the first FIR equalizer.

In still other features, the second data detector path includes a second finite impulse response (FIR) equalizer and a second data detector that receives an output of the second FIR equalizer. The first and second data detectors include at least one of a decision feedback equalizer, a peak detector, a threshold detector, a partial response maximum likelihood detector and a maximum aposteriori detector.

In still other features, a summer has a first input that communicates with an output of the first FIR equalizer. An output of the summer communicates with the first data detector and the baseline correction circuit. The baseline correction circuit outputs the baseline correction signal to a second input of the summer.

In yet other features, the second data detector path includes the first finite impulse response (FIR) filter and further comprises a second filter that has an equalization target with a (1−D) factor and that communicates with an output of the first FIR filter. A second data detector communicates with an output of the second filter.

In other features, a first finite impulse response (FIR) equalizer includes a second filter that has an equalization target with a (1−D) factor and that communicates with an output of the first FIR equalizer. A first data detector selects one of the output of the first FIR equalizer and the output of the second filter. The first data detector path includes the first FIR equalizer and the first data detector. The second data detector path includes the first FIR filter, the second filter and the first data detector.

In other features, a system comprises the data detection circuit and further comprises a perpendicular recording system including a read signal preamplifier. A front end receives a read signal from the read signal preamplifier and communicates with the thermal asperity detector. A sampler communicates with the front end.

In yet other features, the baseline correction circuit includes a delay element that selectively receives an output of the first FIR equalizer. A reconstruction filter selectively receives one of the first and second bit streams from the first and second data detector paths, respectively. A summer has a first input that receives an output of the delay element and a second input that receives an output of the reconstruction filter. An accumulator receives an output of the first summer and generates the baseline correction signal.

In still other features, a system comprises the data detection circuit and further comprises a magnetic medium having sectors. The baseline correction circuit uses the second bit stream until the sector ends when the transient detector senses the transient events during the sector.

A perpendicular recording system according to the present invention includes a perpendicular recording head that generates a read data signal from sectors of a magnetic medium. The read data signal includes at least one of data and transients. A transient detector generates a transient detect signal when the transients are detected in the read data signal. A detection circuit detects data in the read data signal, generates a first detected data signal when the transient detect signal is not generated, and filters the read data signal and generates a second detected data signal when the transient detect signal is generated. When transients are detected during a sector, the detection circuit continues using the second detected data signal until the sector ends.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
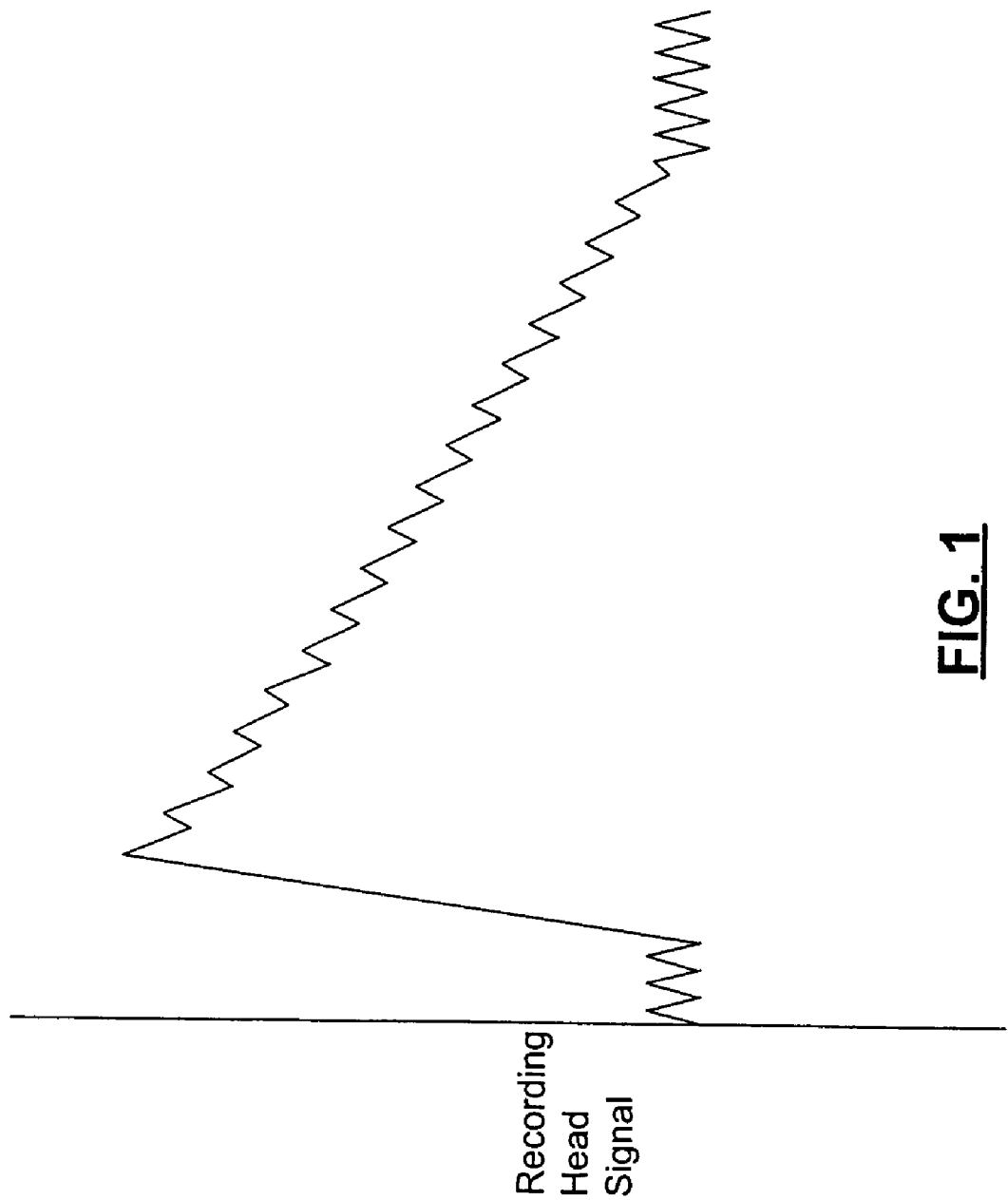
FIG. 1 illustrates a thermal asperity event.

The following description of the preferred embodiments is merely exemplary in nature and is in no way intended to limit the invention, its application, or uses. For purposes of clarity, the same reference numbers will be used in the drawings to identify similar elements.

Figure 2:
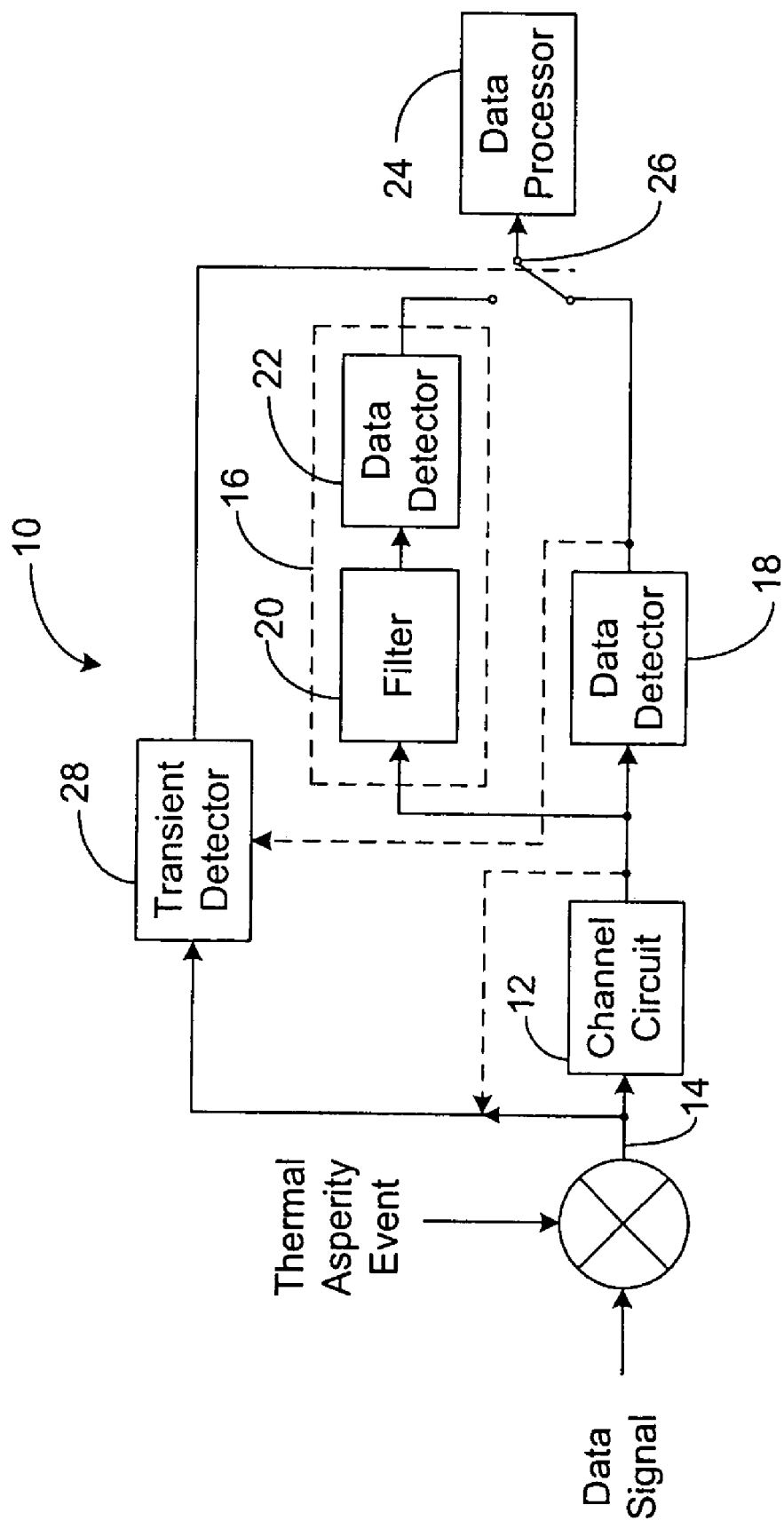
FIG. 2 is a functional block diagram of a data detection circuit with thermal asperity compensation in accordance with the teachings of the present invention.

Referring to FIG. 2, a block diagram of a data detection system 10 is shown. The data detection system 10 eliminates errors in read back data caused by low frequency components in the read back signal of a perpendicular recording system. The data detection system is particularly suitable for use in a perpendicular recording system to eliminate errors in read back data caused by a TA event. Due to the closer proximity of the recording head to the magnetic media in a perpendicular recording system, TA events are typically more numerous and of greater severity. The increased severity is a result of elevated heating of the recording head during the TA event. The increased heating translates to a transient of increased duration and amplitude in the output signal of the recording head. Therefore, the recording head signal of perpendicular recording systems typically includes TA events that occur at an increased rate, and have a longer duration and greater amplitude.

The data detection system 10 includes a discrete channel circuit 12 for interfacing with a perpendicular recording head (not shown) and amplifying the read data signal 14. It is within the scope of the invention for the channel circuit 12 to use analog, digital, or mixed-signal techniques. For example, an analog version of the channel circuit 12 may include a series combination analog preamplifier, filter, and analog forward equalizer. A digital version of the channel circuit 12 preferably includes a preamplifier with automatic gain control (AGC), a sampler, and a digital filer.

The read data signal includes the baseline data signal as well as noise components generated by thermal asperity events and spurious field coupling from noise sources. The optimal target response corresponding to the read data signal of a perpendicular recording system differs from that of a longitudinal recording system. In a perpendicular recording system the optimal target response generally does not have a DC zero since the data elements in the read data typically include a DC bias. Whereas, in a longitudinal recording system the optimal target response does have a DC zero since the data elements in the read data signal do not include a DC bias.

First and second detector circuits 16 and 18 are coupled to the output of the channel circuit 12 for generating output data signals during different operating phases of the data detection system 10. When a low frequency transient such as a TA event is detected, the output signal is taken from the output of the first detector circuit 16. During normal operation of the data detection system 10 in the absence of low frequency transients, the output signal is taken from the output of the second detector circuit 18.

The first detector circuit 16 includes a series connected high-pass filter 20 and data detector 22. The high-pass filter 20 attenuates low frequency components in the read data signal that are caused by the low frequency transient. By removing the low frequency components, the filtered read data signal contains substantially only the high frequency components corresponding to the desired data from the magnetic media in addition to an undesirable leading edge spike caused by the transient. It is within the scope of the invention to employ other filter configurations such as band pass filters and active filters that attenuate low frequency components. Preferably, the filter 20 is a digital implementation having a (1−D) filter characteristic such as (1−0.5D−0.5D$^2$) and (1−0.25D−0.25D$^2$−0.25D$^3$−0.25D$^4$) filters. However, the principles of the invention encompass analog filters as well as digital implementations. The data detector 22 detects the read data pulses in the filtered read data signal. Preferably, a decision feedback equalizer (DFE) is used as the data detector 22 since DFEs provide acceptable implementation complexity. The scope of the invention includes using other detectors such as partial-response maximum likelihood (PRML) detectors and Viterbi detectors for the data detector 22. The first detector circuit 16 is used primarily to process segments of the read data signal that may include low frequency components. The output from the data detector 22 is coupled to a data processor 24 through a switch 26 during segments of the read data signal that include a detected transient.

The second detector circuit 18 preferably employs a Viterbi detector, however the scope of the invention includes using other detectors such as DFE and PRML detectors. As those skilled in the art know, a Viterbi detector is particularly suitable and achieves optimal error rates when the noise present in the data signal can be characterized as being a stationary, white Gaussian process. The second detector circuit 18 is primarily used to process segments of the read data signal that do not include low frequency components associated with a transient such as a TA event. In particular, the read data signal segments may be characterized as preferably containing substantially stationary white Gaussian noise. The output of the detector 18 is coupled through the switch 26 to the processor 24 during segments of the read data signal that do not include a detected transient. It is also within the scope of the invention to disable the detector 18 during a transient such as by decoupling the read data signal from the input.

A transient detector 28 monitors the read data signal for transients, and in response to detecting a transient generates a transient detect signal. Preferably the transient detector 28 monitors the read data signal at the input to the channel circuit 12. However, the scope of the invention includes monitoring the read data signal either at the output or within the channel circuit 12. The scope of the invention also includes monitoring the read data signal at multiple points within the data detection system 10. The transient detector 28 preferably generates the transient detect signal in response to detecting a transient having a low frequency component such as DC. Such a transient may have a fast rising leading edge such as that generated by a TA. The trailing edge of the transient detect signal is determined by one of several methods such as delaying for a predetermined time period following the detection of the leading edge of the transient, monitoring the level of the transient to determine whether the level is less than a threshold, using a combination of time and level monitoring, and monitoring the output of the second data detector 18. For example, a delay time may be selected as a function of the maximum amplitude of the transient, so that given a larger amplitude transient, the delay time defining the trailing edge is increased. The transient detect signal controls the operation of the switch 26 so that during a transient an output signal from the first detector 16 is coupled to the data processor 24.

Figure 3:
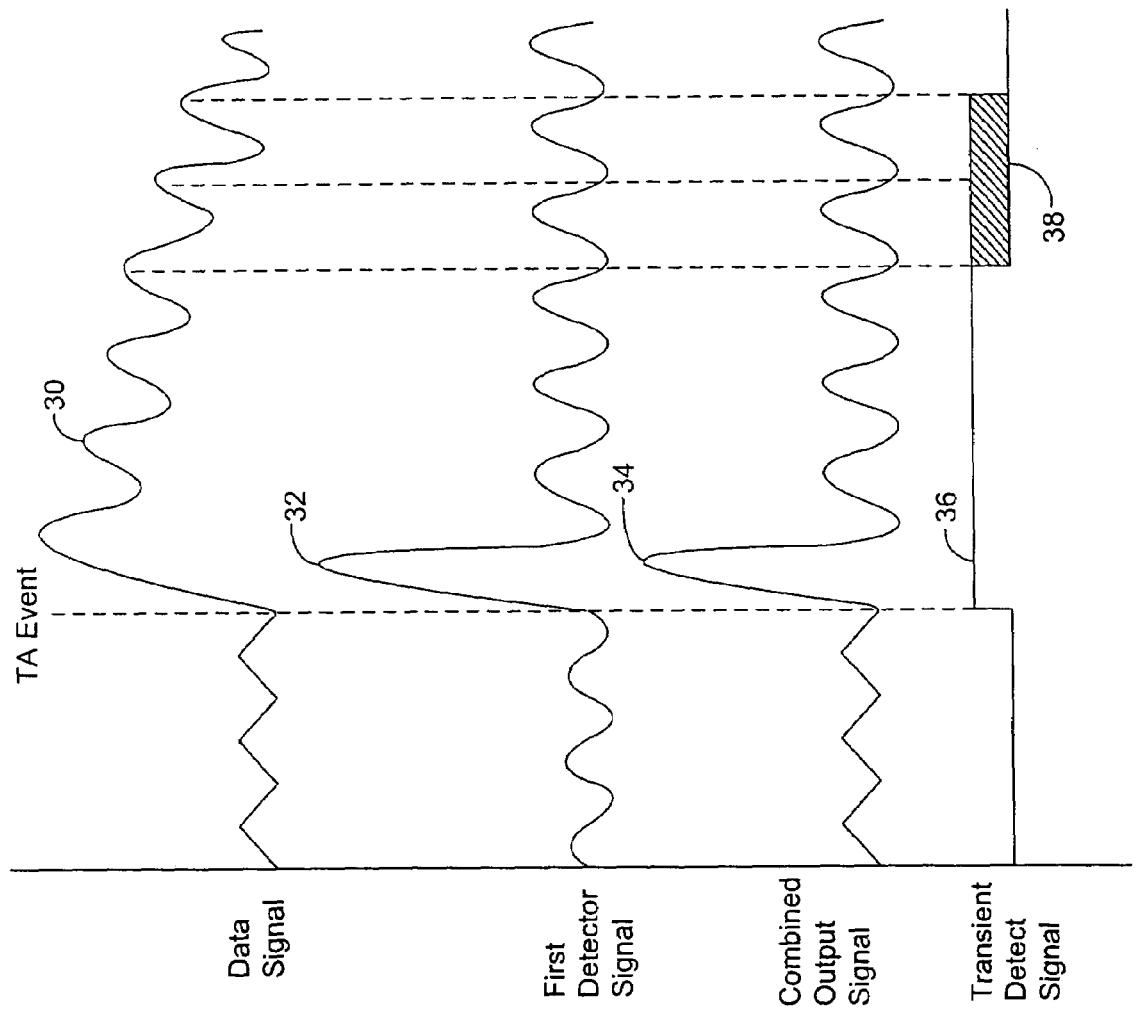
FIG. 3 illustrates a set of waveforms corresponding to the presently preferred embodiment of the thermal asperity compensation system.

Referring to FIG. 3, a set of waveforms corresponding to the data detection system 10 is illustrated. The first waveform 30 shows the data signal that is output from the channel circuit. The second waveform 32 shows the first detector signal. The third waveform 34 shows the combined output signal from the detectors 18 and 22 that is coupled into the data processor 24. The fourth waveform 36 shows the transient detect signal from the transient detector. The hashed portion 38 of the fourth waveform 36 indicates the preferable transition point for the transient detect signal back to steady-state operation. Preferably, the portion of the combined output signal comprised of the output from the first data detector 16 is limited to the period of time during which the output of the second data detector 18 provides inaccurate data. During non-transient operation the second data detector output provides more accurate data than the first data detector output, since there is no series filter to introduce some distortion into the data.

Figure 5:
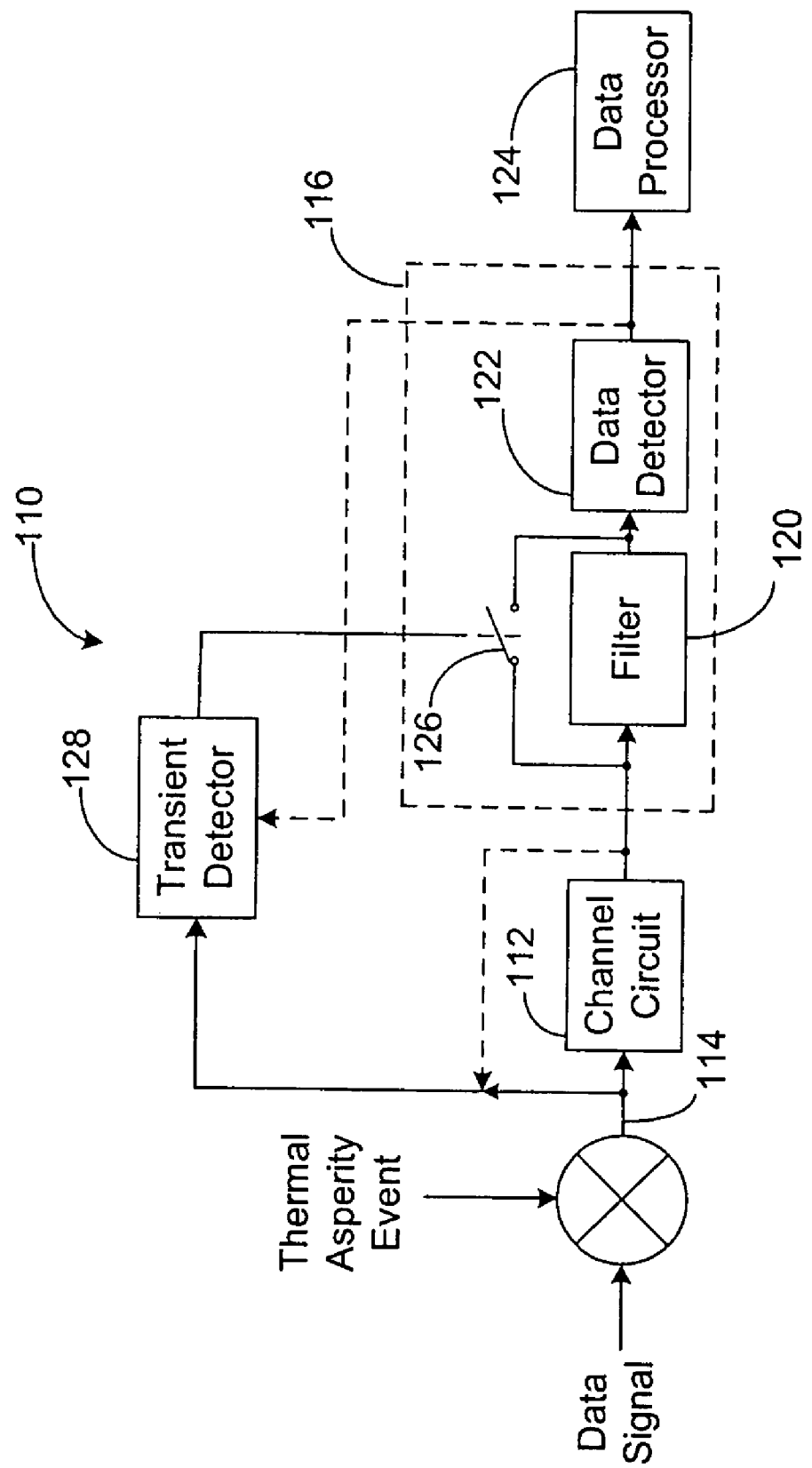
FIG. 5 is a functional block diagram of an alternative embodiment of a data detection circuit with thermal asperity compensation in accordance with the teachings of the present invention.

Referring to FIG. 5, a block diagram of an alternative embodiment of a data detection system 110 is shown. The data detection system 110 is similar to data detection system 10 in function with corresponding elements numbered from 112 to 128, except that only one data detector 122 is required, and switch 126 is connected in parallel with filter 120. Alternately, a selector (not shown) can be used to select either the input of the filter 120 or the output of the filter 120. In operation, the transient detector 128 sets the switch 126 to the closed position to bypass the filter 120 (or a selector selects the filter input) during time periods when a TA event is not present in the read data signal. During time periods when a TA event is present, the transient detector 128 sets the switch 126 to the open position so that low frequency components in the read data signal 114 are filtered by the filter 120. Preferably, the transient detector 128 is a DFE detector, however using other detectors such as Viterbi detectors is also envisioned.

Figure 4:
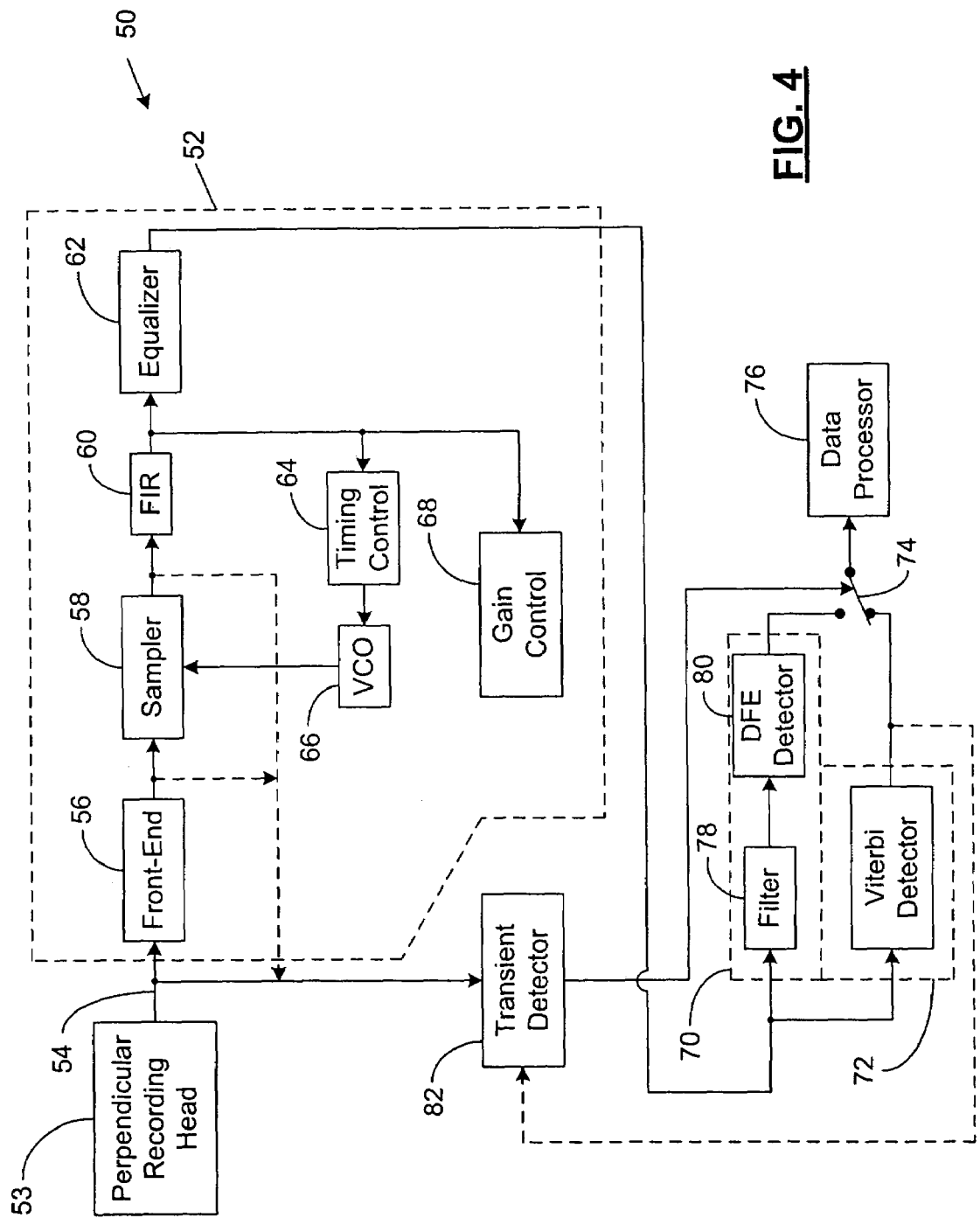
FIG. 4 is a functional block diagram of the data detection circuit with thermal asperity compensation in accordance with the teachings of the present invention.

Referring to FIG. 4, a data detection system 50 includes a discrete channel circuit 52 for amplifying a read data signal 54 that is generated by a perpendicular recording head 53. The read data signal 54 includes the baseline data signal as well as noise components generated by thermal asperity events and spurious field coupling from noise sources. The channel circuit 12 includes a front-end 56 for interfacing with the perpendicular recording head 53. A sampler 58 extracts samples from the read data signal 54. A Finite-Impulse Response (FIR) filter 60 attenuates out-of-band noise components in the read data signal 54. An equalizer 62 removes intersymbol interference from the filtered read data signal 54. Timing control 64 and a voltage controlled oscillator 66 provide control signals to the sampler 58. A gain control 68 adjusts the gain of the front-end 56 to maintain a relatively constant amplitude pulse at the output of the FIR filter 60.

First and second detector circuits 70 and 72 are coupled to the output of the equalizer 62 for generating output data signals that are selectively routed through a switch 74 to a data processor 76. The output of the second detector circuit 72 is routed to the data processor 76 during normal operation. During time periods when a TA event is detected in the read data signal, the output of the first detector circuit 70 is routed to the data processor 76.

The first detector circuit 70 includes a series connected high-pass filter 78 and DFE detector 80. The first detector circuit 70 processes segments of the read data signal that may include low frequency components. The second detector circuit 72 is preferably a Viterbi detector.

A transient detector 82 monitors the read data signal at the output of the front-end 56 for transients. In response to detecting a transient, the transient detector 82 generates a transient detect signal that controls the switch 74. The transient detector 28 generates the transient detect signal in response to detecting a transient generated by a TA event. Such a transient typically has a fast rising leading edge combined with a slowly decaying low frequency component related to the thermal time constant of the TA event. The transient detect signal remains active until the level of the transient in the read data signal decays to less than a predetermined threshold.

Figure 6:
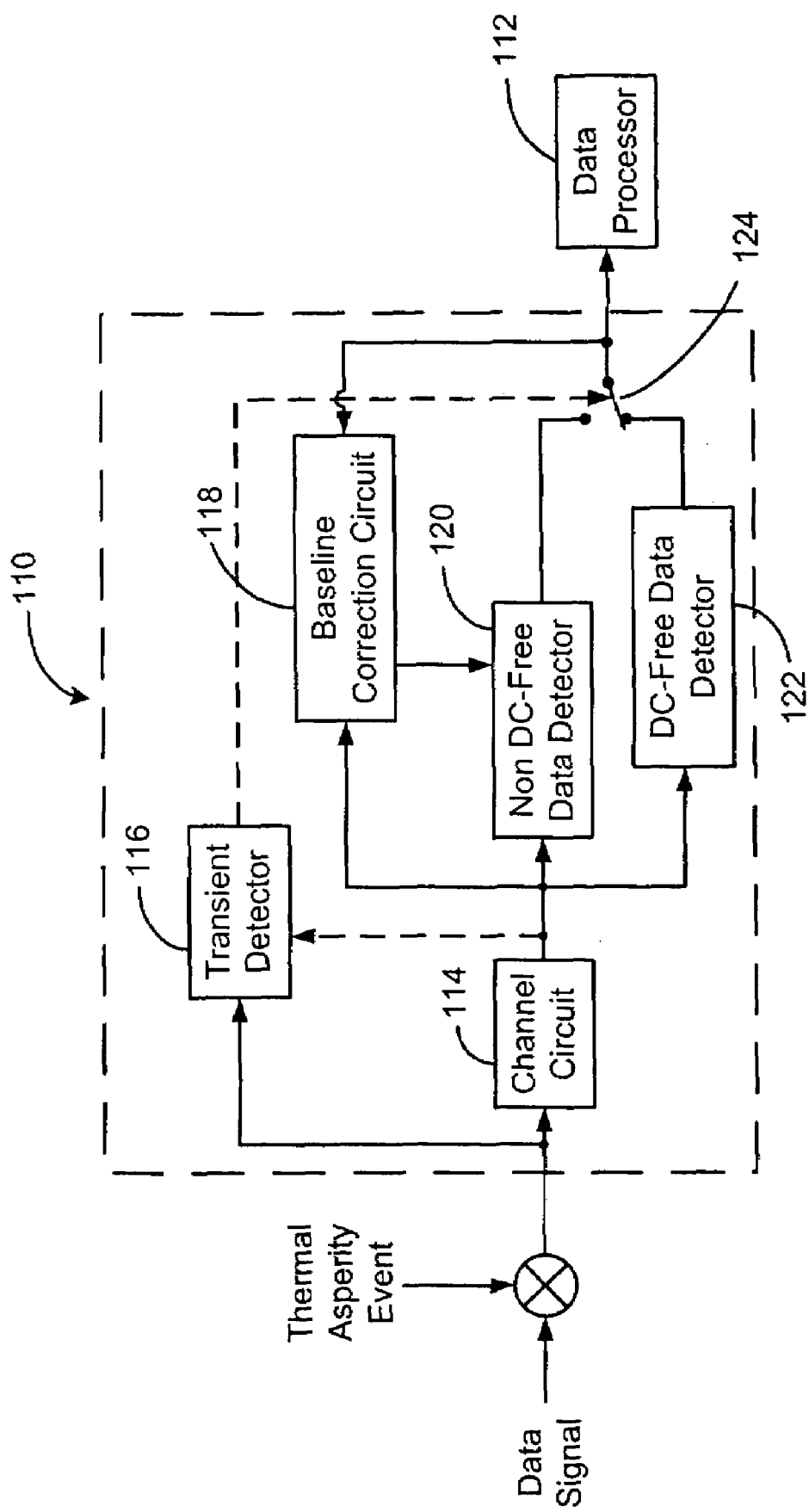
FIG. 6 is a functional block diagram of a data detection circuit with thermal asperity (TA) compensation, a DC-free data detector and a non-DC free data detector and a baseline correction circuit according the principles of the present invention.

Referring to FIG. 6, an alternative data detection circuit 110 with thermal asperity (TA) compensation is shown. The data detection circuit 110 includes a discrete channel circuit 114 that interfaces with a perpendicular recording head (not shown) and amplifies a data signal. The data signal may include transient baseline (BL) components (or DC offset) and/or transient noise components generated by thermal asperity events and spurious field coupling from noise sources.

It is within the scope of the invention for the channel circuit 114 to use analog, digital, or mixed-signal techniques. For example, an analog version of the channel circuit 114 may include a series combination analog preamplifier, filter, and analog forward equalizer. A digital version of the channel circuit 114 may include a preamplifier with automatic gain control (AGC), a sampler, and a digital filter.

The data detection circuit 110 further includes a transient detector 116, a BL correction circuit 118, a non DC-free data detector 120, a DC-free data detector 122 and a switch 124. The non DC-free data detector 120 is sensitive to DC offset of the data signal and the DC-free data detector 122 is insensitive to DC offset of the data signal. The BL correction circuit 118 and non DC-free and DC-free detectors 120 and 122 are coupled to the output of the channel circuit 114.

The non-DC free and DC-free data detectors 120 and 122 generate output data signals or bit streams. As explained in further detail below, when a low frequency transient such as a TA event is detected, the output signal is taken from the output of the DC-free data detector 122. During normal operation of the data detection system, the output signal is taken from the output of the non DC-free data detector 120. The switch 124 selects the output signal, which is output to the data processor 112 and the BL correction circuit 118. As can be appreciated, switches may be integrated with one or more components and separate lines can be run from the detectors 120 and 122 to the components.

The transient detector 116 monitors the data signal for transients and generates a transient detect signal. Preferably the transient detector 116 monitors the data signal at the input to the channel circuit 114. However, it is anticipated that the data signal can be monitored at either the output of or within the channel circuit 114. Further, it is anticipated that the data signal can be monitored at multiple points within the data detection circuit 110.

The transient detector 116 generates the transient detect signal, which controls the position of the switch 124. A TA-induced transient typically has a fast rising leading edge combined with a slowly decaying low frequency component related to the thermal time constant of the TA event. The transient detect signal remains active until the level of the transient in the data signal decays to less than a predetermined threshold. The transient detect signal controls operation of the switch 124 so that, during a transient, an output signal from the DC-free data detector 122 is coupled to the data processor 112 and the BL correction circuit.

As discussed above, the switch 124 changes state after the transient subsides. However, the state of the switch 124 may be changed at other times. The state change can occur after a delay period. For example, the transient detector can actuate the switch 124 some time after the transient subsides. It is also anticipated that the DC-free output can be used until the data sector of the magnetic medium is complete. In other words, if a TA event occurs and subsides during reading of a data sector, the data detection circuit 110 does not switch back to the non DC-free data detector 120 until just before the next data sector.

Figure 7:
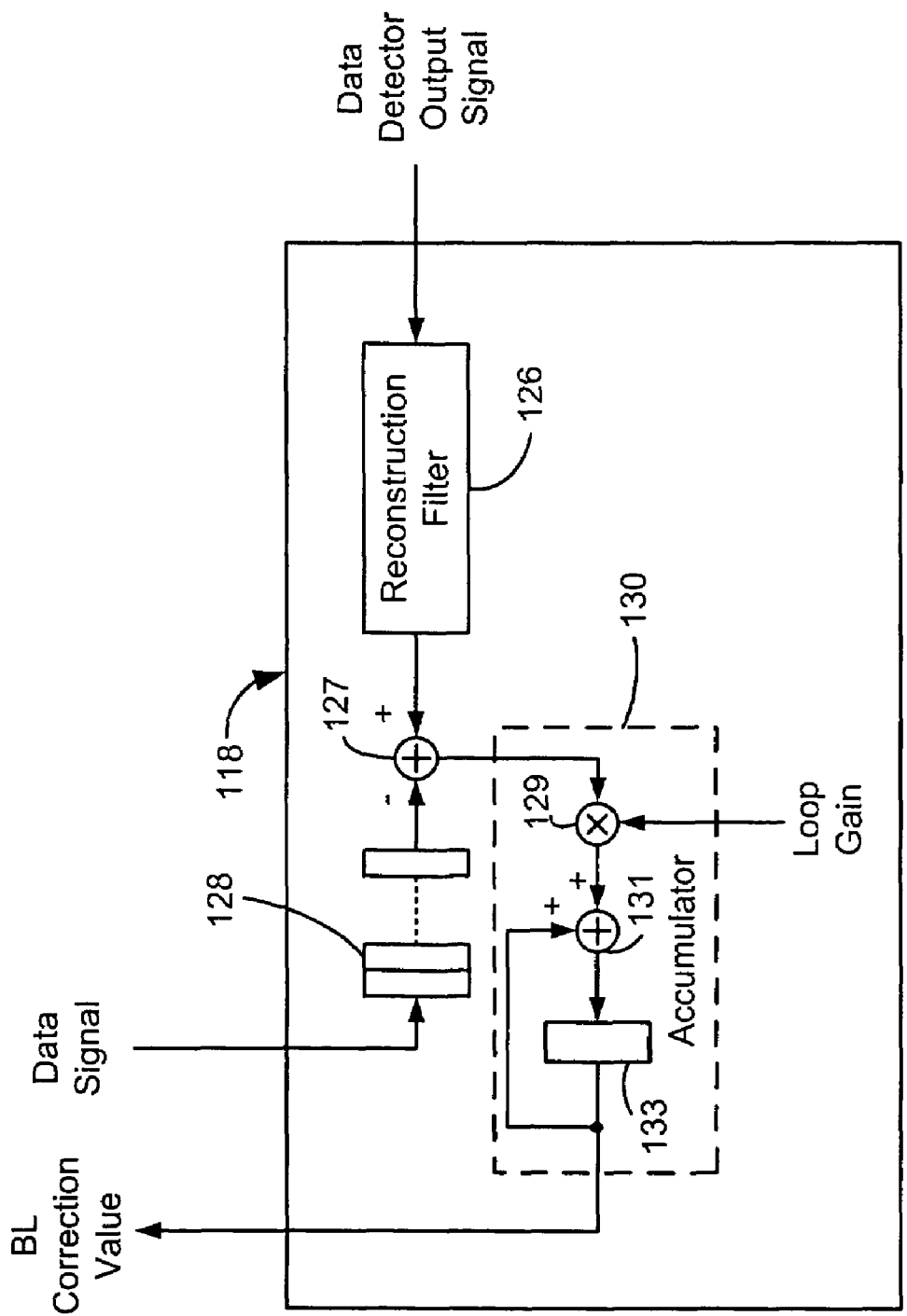
FIG. 7 is a functional block diagram of the baseline correction circuit of the data detection circuit of FIG. 6.

Referring now to FIG. 7, a DC correction circuit 118 receives the data signal and the output signal from either the non-DC free data detector 120 or the DC-free data detector 122 depending on the position of the switch 124. The DC correction circuit 118 includes a reconstruction filter 126, delay elements 128 and an accumulator 130. The reconstruction filter 126 reconstructs the input signal without the TA and BL errors. The reconstruction filter 126 is typically an FIR filter whose taps are the equalization target. For example, if the equalization target is (5, 6, 0, −1), then the FIR taps should be $f_0=5$, $f_1=6$, and $f_3=-1$.

The data detection circuit output signal is processed through the reconstruction filter 126 and is sent to a summer 127. The data signal is subtracted from the output signal to provide a difference signal. The difference signal is multiplied by a loop gain using a multiplier 129. An output of the multiplier 129 is input to a first input of a summer 133. A second input of the summer 131 receives an output of the summer delayed by delay element 131. The DC correction value is output to the non DC-free data detector 120 to minimize the DC offset.

Figure 8:
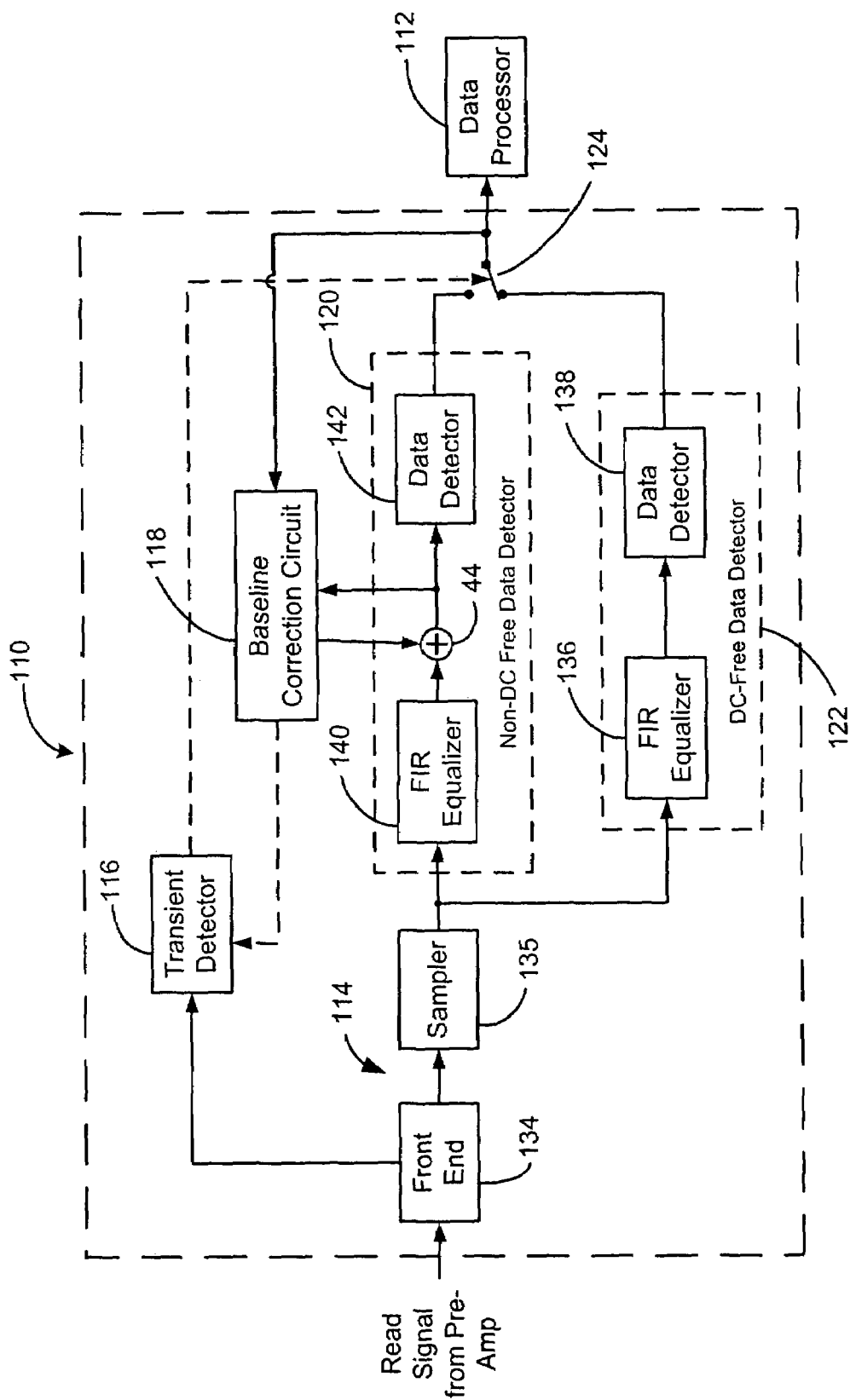
FIG. 8 is a more detailed functional block diagram of the data detection circuit with TA compensation of FIG. 6 that illustrates an embodiment of the DC-free data detector and a non-DC free data detector.

Referring now to FIG. 8, a more detailed block diagram of the data detection circuit 110 with TA compensation of FIG. 6 is shown, including exemplary embodiments of the DC-free data detector 122 and the non DC-free data detector 120. The channel circuit 114 includes a front end 134 for interfacing with the perpendicular recording head (not shown) and a sampler 135 that extracts samples of the data signal. Outputs of the front-end 134 and the BL correction circuit 118 are output to the transient detector 116.

The DC-free data detector 122 includes a finite impulse response (FIR) filter/equalizer 136 and a data detector 138. The FIR filter attenuates out-of-band noise components in the data signal and the equalizer controls or reduces intersymbol interference from the filtered data signal to provide a DC-free target equalization. The filtered data signal contains substantially only the high frequency components. The low frequency portion that is filtered out contains some desired data. However, the effects of the transient is more damaging than the effects of filtering out some of the desired data by removing the transient. It is anticipated that other filters can be employed, such as band pass filters and active filters that attenuate low frequency components. Preferably, the filter is a digital implementation having a (1−D) filter characteristic such as $(1-0.5D-0.5D^2)$ and $(1-0.25D-0.25D^2-0.25D^3-0.25D^4)$ filters. However, the principles of the invention encompass analog filters as well as digital implementations.

The data detector 138 detects bits by matching the DC-free target. The data detector 138 can be one of various data detectors including a Viterbi detector. It is anticipated, however, that the data detector 138 can include other maximum likelihood (PRML) detectors, a decision feedback equalizer (DFE), a peak detector, a threshold detector, a maximum aposteriori probability (MAP) detector, list decoding detectors, sequential decoding detectors, or other suitable detectors.

The non DC-free data detector 120 includes an FIR filter/equalizer 140 and a data detector 142. The FIR filter/equalizer 140 functions as described above to provide a non DC-free target. The non DC-free target is summed with the BL correction value at a summer 144 and is output to the data detector 142. The data detector 142 can be a Viterbi detector, however, other suitable detectors include other maximum likelihood detectors, a decision feedback equalizer (DFE), a peak detector, a threshold detector, a maximum aposteriori probability (MAP) detector, a list decoding detector, a sequential decoding detector, or other suitable detectors.

The non DC-free data detector 120 is primarily used to process segments of the data signal that do not include low frequency components associated with a transient such as a TA event. The output of the non DC-free data detector 120 is selectively coupled through the switch 124 to the data processor 112 and the BL correction circuit 118.

Figure 9:
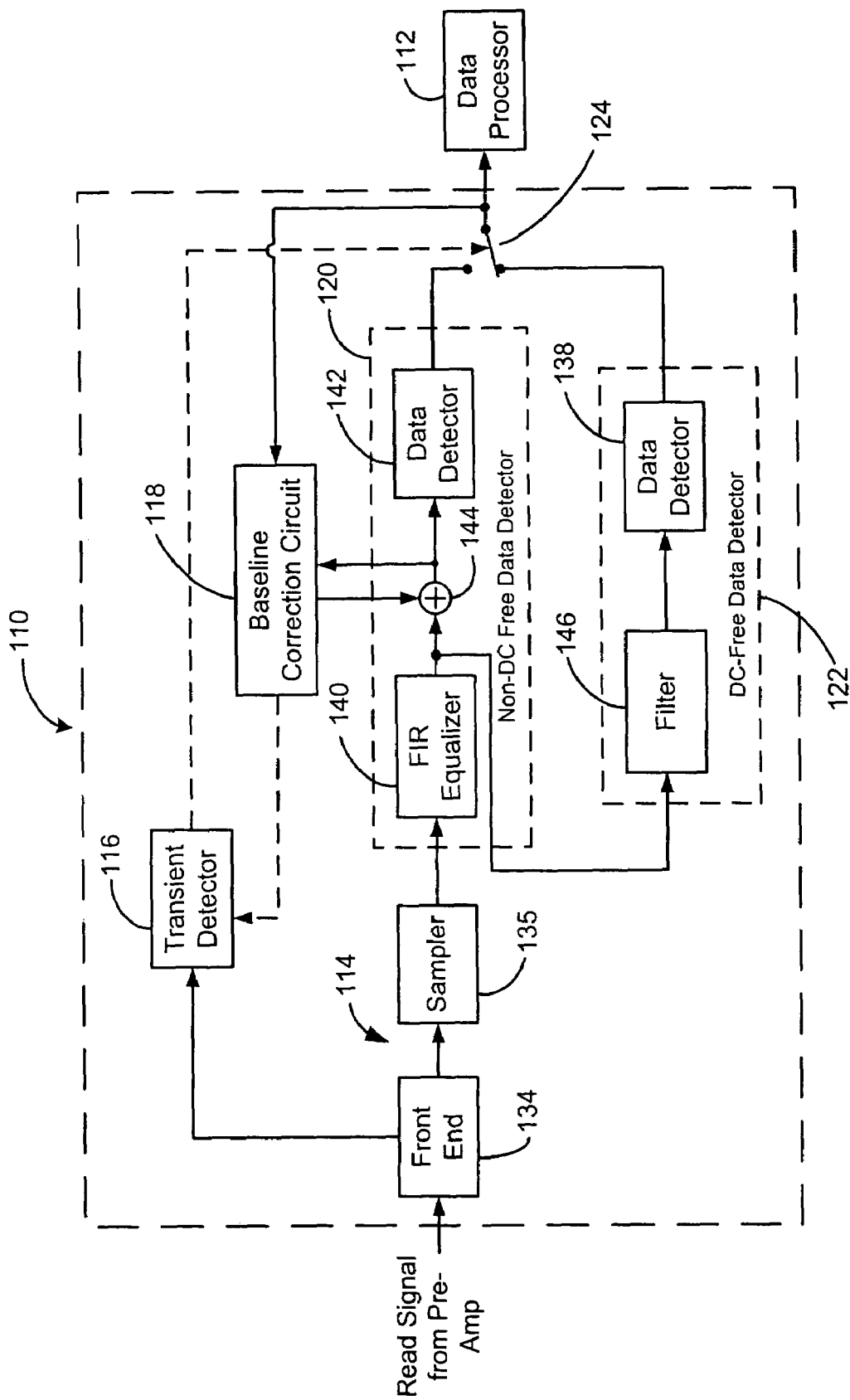
FIG. 9 is a more detailed functional block diagram of the data detection circuit with TA compensation of FIG. 6 that illustrates an alternative embodiment of the DC-free data detector and a non-DC free data detector.

Referring now to FIG. 9, a more detailed block diagram of the data detection circuit with TA compensation of FIG. 8 is shown, including an alternative embodiment of the DC-free data detector 122 and the non DC-free data detector 120. The non DC-free data detector 120 includes the FIR filter and equalizer 140 and the data detector 142. The FIR filter and equalizer 140 function as described above to provide a non DC-free target. The non DC-free target is summed with the BL correction value at the summer 140 and is output to the data detector 142. The data detector 142 is preferably a Viterbi detector, however, it is anticipated that other detectors such as other maximum likelihood detectors, a decision feedback equalizer (DFE), a peak detector, a threshold detector, a maximum aposteriori probability (MAP) detector, a list decoding detector, a sequential decoding detector, or other suitable detectors.

The DC-free data detector 122 includes a filter 146 and the data detector 138. The filter 146 is a high pass filter with a (1−D) filter characteristic and the input is the filtered signal from the FIR/equalizer 140 of the non DC-free data detector 120. As discussed above, the data detector 138 is preferably a Viterbi detector, however, it is anticipated that other detectors such as other maximum likelihood detectors, a decision feedback equalizer (DFE), a peak detector, a threshold detector, a maximum aposteriori probability (MAP) detector, a list decoding detector, a sequential decoding detector, or other suitable detectors.

Figure 10:
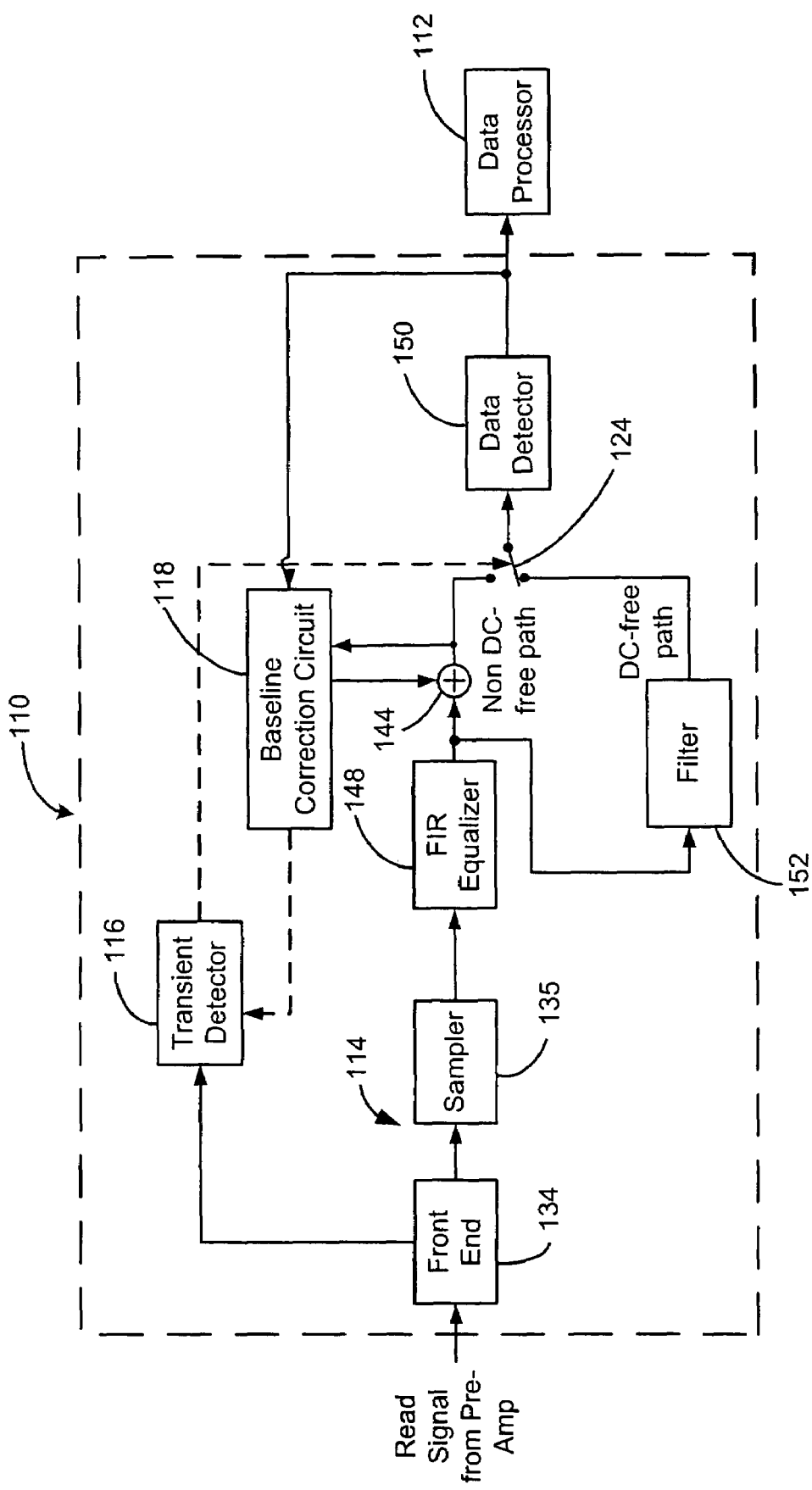
FIG. 10 is a more detailed functional block diagram of the data detection circuit with TA compensation of FIG. 6 that illustrates another alternative embodiment of the DC-free data detector and a non-DC free data detector.

Referring now to FIG. 10, another alternative embodiment of the data detection circuit with TA compensation, indicated as 110', is illustrated. The data detection circuit 110' switches between a non DC-free path and a DC-free path. The data detection circuit 110' normally operates using the non DC-free path. In this case, the signal from the sampler is filtered and equalized in an FIR/equalizer 148. The filtered signal is summed with the BL correction value and is output to a data detector 150 and the BL correction circuit. Again, the data detector 150 can be a Viterbi detector, however, it is anticipated that other detectors such as other maximum likelihood detectors, a decision feedback equalizer (DFE), a peak detector, a threshold detector, a maximum aposteriori probability (MAP) detector, a list decoding detector, a sequential decoding detector, or other suitable detectors. The output signal of the data detector 150 is sent to the data processor 112 and the BL correction circuit 118.

Upon the occurrence of a TA event, the transient detector 116 switches the switch 124 to operate the data detection circuit 110' using the DC-free path. In such a case, the filtered signal from the FIR/equalizer 148 is output to a filter 152. The filter 152 is a high pass filter and the output signal is sent to the data detector 150.

As can be appreciated, the switches 124 that are used in any of the embodiments may be integrated with one or more components. For example, in FIG. 10, the switch 124 may be integrated with the data detector 150. The transient detector 116 communicates with the transient detector 116. Outputs of the summer 144 and the filter 152 are input to the data detector 150.

As can be appreciated, while some of the embodiments were described with preferred types of detectors, skilled artisans will appreciate that Viterbi detectors, other maximum likelihood sequence detectors, decision feedback equalizers (DFE), peak detectors, threshold detectors, maximum aposteriori probability (MAP) detectors, list decoding detectors, sequential decoding detectors, and the like may be used.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A data detection circuit, comprising:
   a transient detector that senses transient events in data;
   a first data detector path that applies a first equalization target to generate a first bit stream from said data;
   a second data detector path that applies a second equalization target to generate a second bit stream from said data; and
   a baseline correction circuit that generates a baseline correction signal using said first bit stream when said transient detector does not sense said transient events and said second bit stream when said transient detector senses said transient events.

2. The data detection circuit of claim 1 wherein said transient events are thermal asperity events.

3. The data detection circuit of claim 1 wherein said first equalization target is a non-DC free equalization target and said second equalization target is a DC-free equalization target.

4. The data detection circuit of claim 1 wherein said first data detector path includes:
   a first finite impulse response (FIR) equalizer that receives said data; and
   a first data detector that receives an output of said first FIR equalizer.

5. The detection circuit of claim 4 wherein said first data detector includes at least one of a Viterbi detector, a decision feedback equalizer, a peak detector, a threshold detector, and a maximum aposteriori detector.

6. The data detection circuit of claim 4 further comprising a summer that has a first input that communicates with an output of said first FIR equalizer, wherein an output of said summer communicates with said first data detector and said baseline correction circuit, and said baseline correction circuit outputs said baseline correction signal to a second input of said summer.

7. The data detection circuit of claim 4 wherein said second data detector path includes said first finite impulse response (FIR) filter and further comprises:
 a second filter that has an equalization target with a (1−D) factor and that communicates with an output of said first FIR filter; and
 a second data detector that communicates with an output of said second filter.

8. The data detection circuit of claim 4 wherein said baseline correction circuit includes:
 a delay element that selectively receives an output of said first FIR equalizer;
 a reconstruction filter that selectively receives one of said first and second bit streams from said first and second data detector paths, respectively;
 a summer that has a first input that receives an output of said delay element and a second input that receives an output of said reconstruction filter; and
 an accumulator that receives an output of said first summer and that generates said baseline correction signal.

9. The data detection circuit of claim 1 wherein said second data detector path includes:
 a second finite impulse response (FIR) equalizer; and
 a second data detector that receives an output of said second FIR equalizer.

10. The detection circuit of claim 9 wherein said second data detector includes at least one of a Viterbi detector, a decision feedback equalizer (DFE), a peak detector, a threshold detector, a maximum aposteriori probability (MAP) detector, a list decoding detector, and a sequential decoding detector.

11. The data detection circuit of claim 1 further comprising:
 a first finite impulse response (FIR) equalizer;
 a second filter that has an equalization target with a (1−D) factor and that communicates with an output of said first FIR equalizer;
 a first data detector that selects one of said output of said first FIR equalizer and said output of said second filter; and
 wherein said first data detector path includes said first FIR equalizer and said first data detector and wherein said second data detector path includes said first FIR filter, said second filter and said first data detector.

12. The data detection circuit of claim 11 wherein said first data detector is at least one of a Viterbi detector, a decision feedback equalizer (DFE), a peak detector, a threshold detector, a maximum aposteriori probability (MAP) detector, a list decoding detector, and a sequential decoding detector.

13. A system comprising the data detection circuit of claim 1 and further comprising:
 a perpendicular recording system including a read signal preamplifier;
 a front end that receives a read signal from a read signal preamplifier and that communicates with said transient detector; and
 a sampler that communicates with said front end.

14. A system comprising the data detection circuit of claim 1 and further comprising:
 a magnetic medium having sectors, wherein said baseline correction circuit uses said second bit stream until said sector ends when said transient detector senses said transient events during said sector.

15. A data detection circuit, comprising:
 a thermal asperity detector that senses said thermal asperity events;
 a data detector that communicates with said thermal asperity detector and that selectively employs a non-DC free equalization target to generate a first bit stream when said thermal asperity events are not sensed and a DC-free equalization target to generate a second bit stream when said thermal asperity events are sensed; and
 a baseline correction circuit that generates a baseline correction signal using said first bit stream when said thermal asperity events are not sensed and said second bit stream when said thermal asperity events are sensed.

16. The data detection circuit of claim 15 wherein said data detector comprises a first data detector path including:
 a first finite impulse response (FIR) equalizer that receives said data; and
 a first data detector that receives an output of said first FIR equalizer.

17. The data detection circuit of claim 16 wherein said first data detector includes at least one of a Viterbi detector, a decision feedback equalizer (DFE), a peak detector, a threshold detector, a maximum aposteriori probability (MAP) detector, a list decoding detector, and a sequential decoding detector.

18. The data detection circuit of claim 16 further comprising a summer that has a first input that communicates with an output of said first FIR equalizer, wherein an output of said summer communicates with said first data detector and said baseline correction circuit, and said baseline correction circuit outputs said baseline correction signal to a second input of said summer.

19. The data detection circuit of claim 16 wherein said data detector includes a second data detector path including said first finite impulse response (FIR) filter and further comprising:
 a second filter that has an equalization target with at least one (1−D) factor and that communicates with an output of said first FIR filter; and
 a second data detector that communicates with an output of said second filter.

20. The data detection circuit of claim 19 wherein said second data detector includes at least one of a Viterbi detector, a decision feedback equalizer (DFE), a peak detector, a threshold detector, a maximum aposteriori probability (MAP) detector, a list decoding detector, and a sequential decoding detector.

21. The data detection circuit of claim 16 wherein said baseline correction circuit includes:
 a delay element that selectively receives an output of said first FIR equalizer;
 a reconstruction filter that selectively receives one of said first and second bit streams from said data detector, respectively;
 a summer that has a first input that receives an output of said delay element and a second input that receives an output of said reconstruction filter; and
 an accumulator that receives an output of said first summer and that generates said baseline correction signal.

22. The data detection circuit of claim 15 wherein said data detector comprises a second data detector path including:
 a second finite impulse response (FIR) equalizer; and
 a second data detector that receives an output of said second FIR equalizer.

23. The data detection circuit of claim 22 wherein said first data detector includes at least one of a Viterbi detector, a decision feedback equalizer (DFE), a peak detector, a threshold detector, a maximum aposteriori probability (MAP) detector, a list decoding detector, and a sequential decoding detector.

24. The data detection circuit of claim 15 wherein said data detector comprises:
a first finite impulse response (FIR) equalizer;
a second filter that has an equalization target with at least one (1−D) factor and that communicates with an output of said first FIR equalizer; and
a first data detector that selectively communicates with said output of said first FIR equalizer and said output of said second filter;
wherein when said thermal asperity is not sensed, said data detector uses a first data detector path that includes said first FIR equalizer and said first data detector and wherein when said thermal asperity is sensed, said data detector uses a second data detector path that includes said first FIR filter, said second filter and said first data detector.

25. The data detection circuit of claim 24 wherein said first data detector includes at least one of a Viterbi detector, a decision feedback equalizer (DFE), a peak detector, a threshold detector, a maximum aposteriori probability (MAP) detector, a list decoding detector, and a sequential decoding detector.

26. A system comprising the data detection circuit of claim 15 and further comprising:
a perpendicular recording system with a read signal preamplifier;
a front end that receives a read signal from said read signal preamplifier and that communicates with said thermal asperity detector; and
a sampler that communicates with said front end.

27. A system comprising the data detection circuit of claim 15 and further comprising:
a magnetic medium having sectors, wherein said baseline correction circuit uses said second bit stream until said sector ends when said transient detector senses said transient events during said sector.

28. A perpendicular recording system, comprising:
a perpendicular recording head that generates a read data signal from sectors of a magnetic medium, wherein said read data signal includes at least one of data and transients;
a transient detector that generates a transient detect signal when said transients are detected in said read data signal; and
a detection circuit that detects data in said read data signal, that generates a first detected data signal when said transient detect signal is not generated, and that filters said read data signal and generates a second detected data signal when said transient detect signal is generated,
wherein when transients are detected during a sector, said detection circuit continues using said second detected data signal until said sector ends.

29. The perpendicular recording system of claim 28 wherein said detection circuit includes:
a first path with a filter and a first data detector;
a second path with a second data detector; and
a selector that communicates with said transient detector and that switches between said first and second paths based on said transient detect signal.

30. The perpendicular recording system of claim 29 wherein said first data detector includes at least one of a Viterbi detector, a decision feedback equalizer (DFE), a peak detector, a threshold detector, a maximum aposteriori probability (MAP) detector, a list decoding detector, and a sequential decoding detector.

31. The perpendicular recording system of claim 29 wherein said second data detector includes at least one of a Viterbi detector, a decision feedback equalizer (DFE), a peak detector, a threshold detector, a maximum aposteriori probability (MAP) detector, a list decoding detector, and a sequential decoding detector.

32. The perpendicular recording system of claim 29 wherein said filter has a high pass filter characteristic.

33. The perpendicular recording system of claim 28 wherein said detection circuit includes:
a filter having an input and an output;
a selector that communicates with said transient detector and said filter and that bypasses said filter when said transient detect signal is present; and
a first detector that receives one of the read data signal from said switch and a filtered read data signal from said filter.

34. The perpendicular recording system of claim 28 further comprising a discrete channel circuit that interfaces with said perpendicular recording head and that amplifies said read data signal.

35. The perpendicular recording system of claim 34 wherein said discrete channel circuit is an analog circuit that includes an analog preamplifier, a filter that communicates with said analog preamplifier, and a forward equalizer that communicates with said filter.

36. The perpendicular recording system of claim 34 wherein said discrete channel circuit is a digital circuit that includes:
a sampling circuit that digitizes said read data signal;
a FIR filter that receives said digitized read data signal from said sampling circuit, that attenuates out of band noise and that generates an attenuated read data signal; and
an equalizer that receives said attenuated read data signal and that removes intersymbol interference (ISI) from said attenuated read data signal.

37. A data detection circuit, comprising:
transient detecting means for sensing transient events in data;
first data detecting means for applying a first equalization target to generate a first bit stream from said data;
second data detecting means for applying a second equalization target to generate a second bit stream from said data; and
baseline correction means for generating a baseline correction signal using said first bit stream when said transient detecting means does not sense said transient events and said second bit stream when said transient detecting means senses said transient events.

38. The data detection circuit of claim 37 when said transient events are thermal asperity events.

39. The data detection circuit of claim 37 wherein said first equalization target is a non-DC free equalization target and said second equalization target is a DC-free equalization target.

40. The data detection circuit of claim 37 wherein said first data detecting means includes:
first finite impulse response (FIR) means for equalizing input data; and first data detecting means for detecting data in an output of said first FIR means.

41. The detection means of claim 40 wherein said first data detecting means includes at least one of a Viterbi detector, a decision feedback equalizer (DFE), a peak detector, a threshold detector, a maximum aposteriori probability (MAP) detector, a list decoding detector, and a sequential decoding detector.

42. The data detection circuit of claim 40 further comprising summing means for receiving an output of said first FIR means, wherein an output of said summing means communicates with said first data detecting means and said baseline correction means, and said baseline correction means outputs said baseline correction signal to said summing means.

43. The data detection circuit of claim 40 wherein said second data detecting means includes said FIR means and further comprises:
second filter means for filtering using an equalization target with a (1–D) factor and that communicates with an output of said first FIR means; and
second data detecting means for detecting data and that communicates with an output of said second filter means.

44. The data detection circuit of claim 40 wherein said baseline correction means includes:
delay means for delaying and for selectively receiving an output of said first FIR means;
reconstruction filter means for selectively receiving one of said first and second bit streams from said first and second data detecting means, respectively;
summing means for summing and that has a first input that receives an output of said delay means and a second input that receives an output of said reconstruction filter means; and
accumulating means for receiving an output of said first summing means and for generating said baseline correction signal.

45. The data detection circuit of claim 37 wherein said second data detecting means includes:
second finite impulse response (FIR) means for equalizing input data; and
second data detecting means for detecting data in an output of said second FIR means.

46. The data detection circuit of claim 45 wherein said second data detecting means includes at least one of a Viterbi detector, a decision feedback equalizer (DFE), a peak detector, a threshold detector, a maximum aposteriori probability (MAP) detector, a list decoding detector, and a sequential decoding detector.

47. The data detection circuit of claim 37 further comprising:
first finite impulse response (FIR) means for equalizing input data;
second filter means for filtering using an equalization target with a (1–D) factor and that communicates with an output of said first FIR means; and
first data detecting means for selecting one of said output of said first FIR means and said output of said second filter means,
wherein said first data detecting means includes said first FIR means and said first data detecting means and wherein said second data detecting means includes said first FIR means, said second filter means and said first data detecting means.

48. The data detection circuit of claim 47 wherein said first data detecting means includes at least one of a Viterbi detector, a decision feedback equalizer (DFE), a peak detector, a threshold detector, a maximum aposteriori probability (MAP) detector, a list decoding detector, and a sequential decoding detector.

49. A system comprising the data detection circuit of claim 37 and further comprising:
perpendicular recording means for recording and including read signal preamplifying means for amplifying a read signal;
receiving means for receiving a read signal from said read signal preamplifying means and that communicates with said transient detecting means; and
sampling means for sampling that communicates with said front end.

50. A system comprising the data detection circuit of claim 37 and further comprising:
magnetic means for storing data and having sectors, wherein said baseline correction means uses said second bit stream until said sector ends when said transient detecting means senses said transient events during said sector.

51. A data detection circuit, comprising:
thermal asperity detecting means for sensing said thermal asperity events;
data detecting means that communicates with said thermal asperity detecting means for selectively employing a non-DC free equalization target to generate a first bit stream when said thermal asperity events are not sensed and a DC-free equalization target to generate a second bit stream when said thermal asperity events are sensed; and
baseline correction means for generating a baseline correction signal using said first bit stream when said thermal asperity events are not sensed and said second bit stream when said thermal asperity events are sensed.

52. The data detection circuit of claim 51 wherein said data detecting means comprises first data detecting means for detecting data including:
first finite impulse response (FIR) means for equalizing and that receives input data; and
first data detecting means for receiving an output of said first FIR means.

53. The data detection circuit of claim 52 wherein said first data detecting means includes at least one of a Viterbi detector, a decision feedback equalizer (DFE), a peak detector, a threshold detector, a maximum aposteriori probability (MAP) detector, a list decoding detector, and a sequential decoding detector.

54. The data detection circuit of claim 52 further comprising summing means for summing and that communicates with an output of said first FIR means, wherein an output of said summing means communicates with said first data detecting means and said baseline correction means, and said baseline correction means outputs said baseline correction signal to said summing means.

55. The data detection circuit of claim 52 wherein said data detecting means includes second data detecting means for detecting data and including said first FIR means and further comprising:
second filter means for filtering using an equalization target with at least one (1–D) factor and that communicates with an output of said first FIR filter; and
second data detecting means for detecting data that communicates with an output of said second filter means.

56. The data detection circuit of claim 55 wherein said second data detecting means includes at least one of a Viterbi detector, a decision feedback equalizer (DFE), a peak detector, a threshold detector, a maximum aposteriori probability (MAP) detector, a list decoding detector, and a sequential decoding detector.

57. The data detection circuit of claim 52 wherein said baseline correction means includes:
delay means for selectively receiving an output of said first FIR means;
reconstruction filter means for selectively receiving one of said first and second bit streams from said data detecting means, respectively;
summing means for summing that has a first input that receives an output of said delay element and a second input that receives an output of said reconstruction filter means; and
accumulating means for receiving an output of said first summing means and for generating said baseline correction signal.

58. The data detection circuit of claim 51 wherein said data detecting means comprises second data detecting means for detecting data including:
second finite impulse response (FIR) means for equalizing input data; and
second data detecting means for receiving an output of said second FIR means.

59. The data detection circuit of claim 58 wherein said second data detecting means includes at least one of a Viterbi detector, a decision feedback equalizer (DFE), a peak detector, a threshold detector, a maximum aposteriori probability (MAP) detector, a list decoding detector, and a sequential decoding detector.

60. The data detection circuit of claim 51 wherein said data detecting means comprises:
first finite impulse response (FIR) means for equalizing input data;
second filter means for filtering using an equalization target with at least one (1−D) factor and that communicates with an output of said first FIR means; and
first data detecting means for selectively communicating with said output of said first FIR means and said output of said second filter means,
wherein when said thermal asperity is not sensed, said data detecting means uses a first data detecting path that includes said first FIR means and said first data detecting means and wherein when said thermal asperity is sensed, said data detecting means uses a second data detecting path that includes said first FIR means, said second filter means and said first data detecting means.

61. The data detection circuit of claim 60 wherein said first data detecting means includes at least one of a Viterbi detector, a decision feedback equalizer (DFE), a peak detector, a threshold detector, a maximum aposteriori probability (MAP) detector, a list decoding detector, and a sequential decoding detector.

62. A system comprising the data detection circuit of claim 51 and further comprising:
perpendicular recording means for storing data and that includes read signal preamplifying means for amplifying a read signal;
receiving means for receiving an amplified read signal from said read signal preamplifying means and that communicates with said thermal asperity detecting means; and
sampling means for sampling that communicates with said receiving means.

63. A system comprising the data detection circuit of claim 51 and further comprising:
magnetic storing means for storing data and including sectors, wherein said baseline correction means uses said second bit stream until said sector ends when said transient detecting means senses said transient events during said sector.

64. A perpendicular recording system, comprising:
perpendicular recording means for generating a read data signal from sectors of a magnetic storing means for storing data, wherein said read data signal includes at least one of data and transients;
transient detecting means for generating a transient detect signal when said transients are detected in said read data signal; and
detection means for detecting data in said read data signal, for generating a first detected data signal when said transient detect signal is not generated, and for filtering said read data signal and generating a second detected data signal when said transient detect signal is generated,
wherein when transients are detected during a sector, said detecting means continues using said second detected data signal until said sector ends.

65. The perpendicular recording system of claim 64 wherein said detecting means includes:
a first path including filter means for filtering and first data detecting means for detecting data;
a second path including second data detecting means for detecting data; and
selector means that communicates with said transient detecting means for switching between said first and second paths based on said transient detect signal.

66. The perpendicular recording system of claim 65 wherein said first data detecting means includes at least one of a Viterbi detector, a decision feedback equalizer (DFE), a peak detector, a threshold detector, a maximum aposteriori probability (MAP) detector, a list decoding detector, and a sequential decoding detector.

67. The perpendicular recording system of claim 65 wherein said second data detecting means includes at least one of a Viterbi detector, a decision feedback equalizer (DFE), a peak detector, a threshold detector, a maximum aposteriori probability (MAP) detector, a list decoding detector, and a sequential decoding detector.

68. The perpendicular recording system of claim 65 wherein said filter means has a high pass filter characteristic.

69. The perpendicular recording system of claim 64 wherein said detecting means includes:
filter means for filtering and including an input and an output;
selector means for bypassing said filter means when said transient detect signal is present;
first detecting means for detecting data and for receiving one of the read data signal from said switch and a filtered read data signal from said filter means.

70. The perpendicular recording system of claim 64 further comprising discrete channel means for interfacing with said perpendicular recording head and for amplifying said read data signal.

71. The perpendicular recording system of claim 70 wherein said discrete channel means includes an analog preamplifier, a filter that communicates with said analog preamplifier, and a forward equalizer that communicates with said filter.

72. The perpendicular recording system of claim 70 wherein said discrete channel means includes:
sampling means for digitizing said read data signal;

FIR filter means for receiving said digitized read data signal from said sampling means, for attenuating out of band noise and for generating an attenuated read data signal; and equalizing means for receiving said attenuated read data signal and for removing intersymbol interference (ISI) from said attenuated read data signal.

73. A method of operating a data detection circuit, comprising:

sensing transient events in data;

applying a first equalization target to generate a first bit stream from said data;

applying a second equalization target to generate a second bit stream from said data; and generating a baseline correction signal using said first bit stream when said transient events are not detected and said second bit stream when said transient events are detected.

74. The method of claim 73 when said transient events are thermal asperity events.

75. The method of claim 74 further comprising detecting data using at least one of a Viterbi detector, a decision feedback equalizer (DFE), a peak detector, a threshold detector, a maximum aposteriori probability (MAP) detector, a list decoding detector, and a sequential decoding detector.

76. The method of claim 73 wherein said first equalization target is a non-DC free equalization target and said second equalization target is a DC-free equalization target.

77. The method of claim 73 further comprising:

reading data from a magnetic medium including sectors; and using said second bit stream until a sector ends when said transient events are sensed during said sector.

78. A method of operating a data detection circuit, comprising:

sensing said thermal asperity events;

selectively employing a non-DC free equalization target to generate a first bit stream when said thermal asperity events are not sensed and a DC-free equalization target to generate a second bit stream when said thermal asperity events are sensed; and generating a baseline correction signal using said first bit stream when said thermal asperity events are not sensed and said second bit stream when said thermal asperity events are sensed.

79. The method of claim 78 further comprising detecting data using at least one of a Viterbi detector, a decision feedback equalizer (DFE), a peak detector, a threshold detector, a maximum aposteriori probability (MAP) detector, a list decoding detector, and a sequential decoding detector to detect data.

80. The method of claim 78 further comprising:

reading data from a magnetic medium including sectors; and using said second bit stream until a sector ends when said transient events are sensed during said sector.

81. A method of operating a perpendicular recording system, comprising:

generating a read data signal from sectors of a magnetic storing means for storing data, wherein said read data signal includes at least one of data and transients;

generating a transient detect signal when said transients are detected in said read data signal;

detecting data in said read data signal by at least one of generating a first detected data signal when said transient detect signal is not generated and by filtering said read data signal and generating a second detected data signal when said transient detect signal is generated; and using said second detected data signal until said sector ends when transients are detected during a sector.

82. The method of claim 81 wherein said data detecting step uses at least one of a Viterbi detector, a decision feedback equalizer (DFE), a peak detector, a threshold detector, a maximum aposteriori probability (MAP) detector, a list decoding detector, and a sequential decoding detector.

* * * * *

UNITED STATES PATENT AND TRADEMARK OFFICE
CERTIFICATE OF CORRECTION

| | |
|---|---|
| PATENT NO. | : 7,286,311 B1 |
| APPLICATION NO. | : 10/754325 |
| DATED | : October 23, 2007 |
| INVENTOR(S) | : Mats Oberg et al. |

It is certified that error appears in the above-identified patent and that said Letters Patent is hereby corrected as shown below:

Column 3, Line 64      Insert -- to -- after "according"

Signed and Sealed this

Twenty-seventh Day of May, 2008

JON W. DUDAS
*Director of the United States Patent and Trademark Office*